US 9,494,273 B2

(12) United States Patent
Wang et al.

(10) Patent No.: US 9,494,273 B2
(45) Date of Patent: Nov. 15, 2016

(54) CASING TENSIONER PLATFORM FRAME AND CASING TENSIONER PLATFORM FRAME KIT

(71) Applicant: Shanghai Zhenhua Heavy Industries Co., Ltd., Shanghai (CN)

(72) Inventors: Kezhu Wang, Shanghai (CN); Fusheng Wu, Shanghai (CN); Sulei Xu, Shanghai (CN); Hao Feng, Shanghai (CN)

(73) Assignee: Shanghai Zhenhua Heavy Industries Co., Ltd., Shanghai (CN)

( * ) Notice: Subject to any disclaimer, the term of this patent is extended or adjusted under 35 U.S.C. 154(b) by 0 days.

(21) Appl. No.: 14/705,486

(22) Filed: May 6, 2015

(65) Prior Publication Data
US 2016/0201842 A1    Jul. 14, 2016

(30) Foreign Application Priority Data
Jan. 12, 2015 (CN) .......................... 2015 1 0014385

(51) Int. Cl.
*E04H 12/00* (2006.01)
*F16M 1/00* (2006.01)
*F16B 7/18* (2006.01)

(52) U.S. Cl.
CPC . *F16M 1/00* (2013.01); *F16B 7/18* (2013.01)

(58) Field of Classification Search
CPC .................................... F16M 1/00; F16B 7/18
(Continued)

(56) References Cited

U.S. PATENT DOCUMENTS 1,347,808 A * 7/1920 Franklin .............. A63H 33/108
403/119
1,483,602 A * 2/1924 Bloss ...................... E21B 15/00
403/171
(Continued)

FOREIGN PATENT DOCUMENTS

| CN | 2500527 Y | 7/2002 |
| CN | 2841593 Y | 11/2006 |
| CN | 204402393 U | 6/2015 |

OTHER PUBLICATIONS

Office Action issued in Chinese Patent Application No. 201510014385.1; Dated Mar. 4, 2016 (5 pages).
(Continued)

*Primary Examiner* — Basil Katcheves
*Assistant Examiner* — Joshua Ihezie
(74) *Attorney, Agent, or Firm* — Osha Liang LLP (57) ABSTRACT

Embodiments of the present invention disclose a casing tensioner platform frame kit. The kit comprises frame components, corner connectors, rod components and rod connection components. The frame components and the corner connectors form a hexahedral frame. The rod components are fixed on the front planes and lateral planes of the hexahedral frame via the rod connection components. The frame components, corner connectors, rod components and rod connection components are all removable. Embodiments of the present invention also disclose a casing tensioner platform frame. The casing tensioner platform frame kit and the casing tensioner platform frame assembled by the kit provided by the present invention may be easily assembled or disassembled. The assembly or disassembly is implemented via prefabricated mounting components without any welding. The casing tensioner platform frame kit may be transported in the manner of components and be assembled
(Continued)

at field. The cost of transportation and installation is significantly reduced while the quality and safety of the product is ensured.

20 Claims, 7 Drawing Sheets

(58) Field of Classification Search
USPC .............................................. 52/653.1, 655.1
See application file for complete search history.

(56) References Cited

U.S. PATENT DOCUMENTS

| | | | | |
|---|---|---|---|---|
| 2,487,169 A * | 11/1949 | Newell | ................ | E04B 1/5843 403/202 |
| 2,839,320 A * | 6/1958 | Hill | .................. | E04G 7/02 135/909 |
| 4,053,063 A | 10/1977 | Harper, Jr. | | |
| 4,098,491 A | 7/1978 | Larralde | | |
| 4,274,222 A * | 6/1981 | Zahn | ................... | A63H 33/102 124/5 |
| 4,437,288 A * | 3/1984 | Foissac | ................. | E04H 12/02 403/171 |
| 4,676,043 A * | 6/1987 | Grimm | ................ | E04B 1/1903 403/171 |
| 4,745,725 A * | 5/1988 | Onoda | ................ | B64G 9/00 52/646 |
| 4,899,497 A * | 2/1990 | Madl, Jr. | ............. | E04B 1/0007 52/126.6 |
| 4,930,930 A * | 6/1990 | Coppa | ................. | E04B 1/1909 403/170 |
| 5,040,349 A * | 8/1991 | Onoda | ................ | B64G 9/00 52/645 |
| 5,125,206 A * | 6/1992 | Motohashi | ............. | B64G 9/00 52/646 |
| 5,230,197 A * | 7/1993 | Hart | .................. | E04B 1/19 52/638 |
| RE35,085 E * | 11/1995 | Sanderson | ........... | E04B 1/1903 403/171 |
| 5,711,131 A * | 1/1998 | Thomas | ................ | E04C 3/08 403/170 |
| 6,056,240 A * | 5/2000 | Hagenlocher | ........... | B64B 1/08 244/125 |
| 6,260,625 B1 | 7/2001 | Phan et al. | | |
| 6,401,983 B1 * | 6/2002 | McDonald | .............. | B60P 1/56 220/1.5 |
| 6,408,587 B2 * | 6/2002 | Cronin | ................ | B60P 1/56 182/178.1 |
| 6,986,230 B2 * | 1/2006 | Schipani | ............... | A47F 5/13 211/199 |
| 7,703,615 B2 * | 4/2010 | Willim | ................ | B66C 23/70 212/175 |
| 8,028,488 B2 * | 10/2011 | Dodd | ................. | E04C 3/005 52/128 |
| 8,528,291 B2 * | 9/2013 | Allred, III | .......... | F16B 7/0426 135/909 |
| 2004/0088941 A1 * | 5/2004 | Boots | ................ | A47B 47/027 52/655.1 |
| 2005/0129464 A1 * | 6/2005 | Moncus | ............... | E21B 19/006 405/203 |
| 2006/0230704 A1 * | 10/2006 | Lambreth | ............. | E04B 1/34 52/745.02 |
| 2010/0031600 A1 * | 2/2010 | Nakagawa | ............ | E04B 1/24 52/653.1 |
| 2010/0192506 A1 * | 8/2010 | Allred, III | ............ | E04C 3/08 52/655.1 |
| 2011/0179741 A1 * | 7/2011 | Yen | ..................... | E04B 1/34326 52/653.1 |
| 2012/0298449 A1 * | 11/2012 | Kreller | ................ | E04G 1/14 182/113 |
| 2014/0166647 A1 * | 6/2014 | Sheesley | ............. | B65D 90/66 220/1.5 |
| 2015/0247316 A1 * | 9/2015 | Coupe | ................. | E04B 1/34315 52/650.1 |

OTHER PUBLICATIONS

Office Action and Search Report dated Jul. 6, 2015, issued by the UK Intellectual Property Office in corresponding UK Patent Application No. GB1504081.9 (3 pages).

* cited by examiner

CASING TENSIONER PLATFORM FRAME AND CASING TENSIONER PLATFORM FRAME KIT

BACKGROUND OF THE INVENTION

1. Field of the Invention

The present invention relates to offshore engineering equipments, more particularly, to offshore drilling equipment.

2. The Related Art

Drilling platform is the most important offshore drilling equipment. A casing tensioner is mounted in a casing tensioner platform frame, which bears the load generated by the casing tensioner during tensioning of the casing. The casing tensioner platform frame is mounted under a cantilever beam and positioned within a moon pool. The casing tensioner is mounted in a casing tensioner platform frame.

Most of the existing casing tensioner platform frames have a fixed structure and their components are not removable. The components are combined in a non-removable manner, such as welding to form a monolithic casing tensioner platform frame on the ground, then the monolithic casing tensioner platform frame are transported and hoisted onto the drilling platform. Because of the huge volume and weight of the combined monolithic casing tensioner platform frame, the cost of transportation and installation is very high. If another method is used, that is, the components are transported separately and are welded at field, other problems will occur. The drilling platform is positioned on the sea, in an environment of wide temperature variation and high humidity, which is disadvantage to welding and will significantly affect the welding quality. Thus, welding field on the sea may bring potential safety risks.

Therefore, a casing tensioner platform frame with removable components that may be assembled at field is demanded.

SUMMARY

According to an embodiment of the present invention, a casing tensioner platform frame kit is provided. The kit comprises frame components, corner connectors, rod components and rod connection components. The frame components comprise front beams, lateral beams and posts. Each corner connector has three main mounting brackets which are perpendicular to each other, the corner connector further has an auxiliary mounting bracket extending diagonally between two main mounting brackets which constitute a lateral plane. The rod components comprise front rods and lateral rods. The rod connection components comprise rod connectors and rod retainers, the rod connector is mounted on the front beam, the rod connector has at least one rod mounting bracket, the rod retainer is mounted on the front beam, the rod retainer has at least one rod fixing point, wherein the rod connector and the rod retainer are mounted on front beams that are disposed oppositely. The front beams, the lateral beams and the posts are connected via the corner connectors to constitute a hexahedral frame, the three main mounting brackets of each corner connector are connected to one front beam, one lateral beam and one post respectively. The lateral rods are connected via the auxiliary mounting brackets of the corner connectors, two ends of each lateral rod are connected to the auxiliary mounting brackets of two corner connectors that are disposed diagonally. The front rods are connected via the rod connectors and the rod retainers, two ends of each front rod are connected to one rod mounting bracket and one rod fixing point respectively.

According to an embodiment, each end of the front beams, the lateral beams and the posts forms an end cylinder and a mounting screw. The three main mounting brackets of the corner connector each forms a cylindrical spigot and a mounting hole. Each end cylinder of the front beams, the lateral beams and the posts matches the cylindrical spigot of the corresponding main mounting bracket respectively, and the diameter of the mounting screw matches the diameter of the corresponding mounting hole. Each end cylinder of the front beams, the lateral beams and the posts is inserted into the cylindrical spigot of the corresponding main mounting bracket, the mounting screw passes through the corresponding mounting hole and a mounting nut with a diameter larger than the mounting hole is screwed on the mounting screw, so that the front beams, the laterals and the posts are connected to the main mounting brackets of the corner connectors.

According to an embodiment, pads are inserted between the end cylinders of the front beams, the lateral beams and the posts and the cylindrical spigots of the corresponding main mounting brackets.

According to an embodiment, each end of the lateral rods forms an end cylinder and a mounting screw. The auxiliary mounting bracket of the corner connector forms two obround holes. Each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket. Each end cylinder of the lateral rods is mounted into the semicircle of the outer obround hole of the corresponding auxiliary mounting bracket, the mounting screw enters the semicircle of the inner obround hole and a mounting nut with a diameter larger than the mounting screw is screwed on the mounting screw, so that the lateral rods are connected to the auxiliary mounting brackets of the corner connectors.

According to an embodiment, the lateral rods comprise main lateral rods and auxiliary lateral rods, one main lateral rod and one auxiliary lateral rod are used in pairs. The auxiliary lateral rod is a continuous column with a first bore in the middle. The main lateral rod forms a rectangle orifice in the middle, the dimension of the rectangle orifice is larger than the dimension of the cross section of the auxiliary lateral rod, the rectangle orifice has a second bore thereon, the second bore has the same diameter as the first bore. The auxiliary lateral rod passes through the rectangle orifice of the main lateral rod to form a cross structure, the first bore and the second bore align to each other and an axle passes through the first bore and the second bore, the diameter of the axle matches the diameter of the first bore and the second bore, the axle forms a step cap on one end and the diameter of the step cap is larger than the first bore and the second bore, the axle has a pin hole on the other end, a pin is inserted in the pin hole to connect the main lateral rod and the auxiliary lateral rod.

According to an embodiment, the main mounting bracket of the corner connector has an operation hole approximating the cylindrical spigot. The auxiliary mounting bracket of the corner connector has an operation hole approximating the obround hole. The corner connector further has a moon pool positioning hole.

According to an embodiment, one end of the front rod forms an end cylinder and a mounting screw, the other end of the front rod forms a fixing sheet and a fixing pin. The rod mounting bracket of the rod connector has two obround holes, the rod fixing point of the rod retainer is a bore. Each end cylinder of the front rods matches the semicircle of the outer obround hole of the corresponding rod mounting bracket, and the diameter of the mounting screw matches the diameter of the semicircle of the inner obround hole of the corresponding rod mounting bracket, the diameter of the bore matches the diameter of the fixing pin. Each end cylinder on one end of the front rods is mounted into the semicircle of the outer obround hole of the corresponding rod mounting bracket, the mounting screw enters the semicircle of the inner obround hole and a mounting nut with a diameter larger than the mounting screw is screwed on the mounting screw, so that one end of the front rods are connected to the rod mounting brackets of the rod connectors. Each fixing sheet on the other end of the front rods touches one side of the rod retainer and the fixing pin passes through the bore, a pin nut with a diameter larger than the bore is screwed on the fixing pin from the other side of the rod retainer, so that the other end of the front rods are connected to the rod retainers.

According to an embodiment, the corner connectors comprise top corner connectors and bottom corner connectors. The top corner connector further has an auxiliary rod retainer extending diagonally between two main mounting brackets which constitute a front plane, the auxiliary rod retainer forms a rod fixing point.

According to an embodiment, the front beams comprise top front beams and bottom front beams, the cross section of the bottom front beam is larger than the cross section of the top front beam. The lateral beams comprise top lateral beams and bottom lateral beams, the cross section of the bottom lateral beam is larger than the cross section of the top lateral beam.

According to an embodiment of the present invention, a casing tensioner platform frame is provided. The casing tensioner platform frame comprises a hexahedral frame, at least one rod connector and at least one rod retainer, two pairs of lateral rods and a plurality of front beams. The hexahedral frame is composed of four front beams, four lateral beams and four posts connected via eight corner connectors. The eight corner connectors are disposed at eight vertexes of the hexahedral frame. Each corner connector has three main mounting brackets which are perpendicular to each other, the corner connector further has an auxiliary mounting bracket extending diagonally between two main mounting brackets which constitute a lateral plane. The three main mounting brackets of each corner connector connect to one front beam, one lateral beam and one post respectively. At least one rod connector is mounted on bottom front beams, at least one rod retainer is mounted on top front beams, the rod connector has at least one rod mounting bracket, the rod retainer has at least one rod fixing point. Two pairs of lateral rods are disposed on two lateral planes of the hexahedral frame respectively, each pair of lateral rods comprises two lateral rods which form a cross structure, the ends of the two lateral rods are connected to the auxiliary mounting brackets of four corner connectors respectively. A plurality of front rods are disposed on two front planes of the hexahedral frame respectively, the lower end of each front rod is connected to a rod mounting bracket, the upper end of each front rod is connected to a rod fixing point.

According to an embodiment, each end of the front beams, the lateral beans and the posts forms an end cylinder and a mounting screw. The three main mounting brackets of the corner connector each forms a cylindrical spigot and a mounting hole. Each end cylinder of the front beams, the lateral beams and the posts matches the cylindrical spigot of the corresponding main mounting bracket respectively, and the diameter of the mounting screw matches the diameter of the corresponding mounting hole. Each end cylinder of the front beams, the lateral beams and the posts is inserted into the cylindrical spigot of the corresponding main mounting bracket, the mounting screw passes through the corresponding mounting hole and a mounting nut with a diameter larger than the mounting hole is screwed on the mounting screw, so that the front beams, the laterals and the posts are connected to the main mounting brackets of the corner connectors.

According to an embodiment, pads are inserted between the end cylinders of the front beams, the lateral beams and the posts and the cylindrical spigots of the corresponding main mounting brackets.

According to an embodiment, each pair of lateral rods are composed of one main lateral rod and one auxiliary lateral rod. The auxiliary lateral rod is a continuous column with a first bore in the middle. The main lateral rod forms a rectangle orifice in the middle, the dimension of the rectangle orifice is larger than the dimension of the cross section of the auxiliary lateral rod, the rectangle orifice has a second bore thereon, the second bore has the same diameter as the first bore. The auxiliary lateral rod passes through the rectangle orifice of the main lateral rod to form a cross structure, the first bore and the second bore align to each other and an axle passes through the first bore and the second bore, the diameter of the axle matches the diameter of the first bore and the second bore, the axle forms a step cap on one end and the diameter of the step cap is larger than the first bore and the second bore, the axle has a pin hole on the other end, a pin is inserted in the pin hole to connect the main lateral rod and the auxiliary lateral rod.

According to an embodiment, each end of the lateral rods forms an end cylinder and a mounting screw. The auxiliary mounting bracket of the corner connector forms two obround holes. Each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket. Each end cylinder of the lateral rods is mounted into the semicircle of the outer obround hole of the corresponding auxiliary mounting bracket, the mounting screw enters the semicircle of the inner obround hole and a mounting nut with a diameter larger lager than the mounting screw is screwed on the mounting screw, so that the lateral rods are connected to the auxiliary mounting brackets of the corner connectors.

According to an embodiment, the lower end of the front rod forms an end cylinder and a mounting screw, the upper end of the front rod forms a fixing sheet and a fixing pin. The rod mounting bracket of the rod connector has two obround holes, the rod fixing point of the rod retainer is a bore. Each end cylinder of the front rods matches the semicircle of the outer obround hole of the corresponding rod mounting bracket, and the diameter of the mounting screw matches the diameter of the semicircle of the inner obround hole of the corresponding rod mounting bracket, the diameter of the bore matches the diameter of the fixing pin. Each end cylinder on the lower end of the front rods is mounted into the semicircle of the outer obround hole of the corresponding rod mounting bracket, the mounting screw enters the semicircle of the inner obround hole and a mounting nut with a diameter larger than the mounting screw is screwed on the mounting screw, so that the lower end of the front rods are connected to the rod mounting brackets of the rod connectors. Each fixing sheet on the upper end of the front rods touches one side of the rod retainer and the fixing pin passes through the bore, a pin nut with a diameter larger than the bore is screwed on the fixing pin from the other side of the rod retainer, so that the upper end of the front rods are connected to the rod retainers.

According to an embodiment, the bottom of the rod connector is mounted on the bottom front beam, the top of the rod connector has at least one rod mounting bracket, the rod mounting bracket extends diagonally with an angle of 0°~180° with respect to the horizontal. The top of the rod retainer is mounted on the top front beam, the bottom of the rod retainer forms at least one rod fixing point.

According to an embodiment, the eight corner connectors comprises four top corner connectors and four bottom corner connectors. The main mounting bracket of the each top corner connector and each bottom corner connector has an operation hole approximating the cylindrical spigot. The auxiliary mounting bracket of each top corner connector and each bottom corner connector has an operation hole approximating the obround hole. Each top corner connector and each bottom corner connector further has a moon pool positioning hole. Each top corner connector further has an auxiliary rod retainer extending diagonally between two main mounting brackets which constitute a front plane, the auxiliary rod retainer forms a rod fixing point.

According to an embodiment, the cross section of the bottom front beam is larger than the cross section of the top front beam. The cross section of the bottom lateral beam is larger than the cross section of the top lateral beam.

The casing tensioner platform frame kit and the casing tensioner platform frame assembled by the kit provided by the present invention may be easily assembled or disassembled. The assembly or disassembly is implemented via prefabricated mounting components without any welding. The casing tensioner platform frame kit may be transported in the manner of components and be assembled at field. The cost of transportation and installation is significantly reduced while the quality and safety of the product is ensured.

BRIEF DESCRIPTION OF THE DRAWINGS

The above and other features, natures, and advantages of the invention will be apparent by the following description of the embodiments incorporating the drawings, wherein.

DETAILED DESCRIPTION OF EMBODIMENTS

Figure 1:
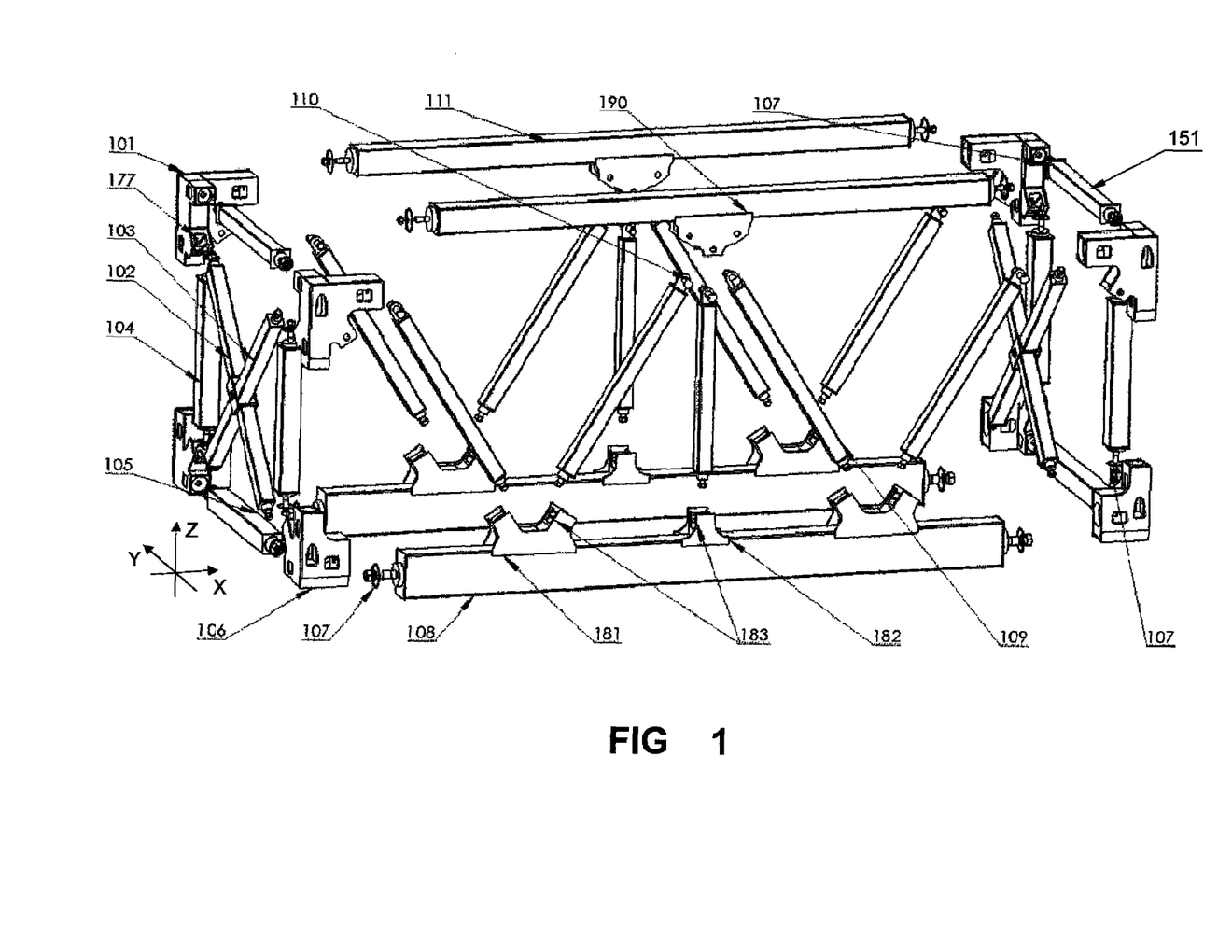
FIG. 1 illustrates a structural diagram of a casing tensioner platform frame kit according to an embodiment of the present invention.
Figure 2A:
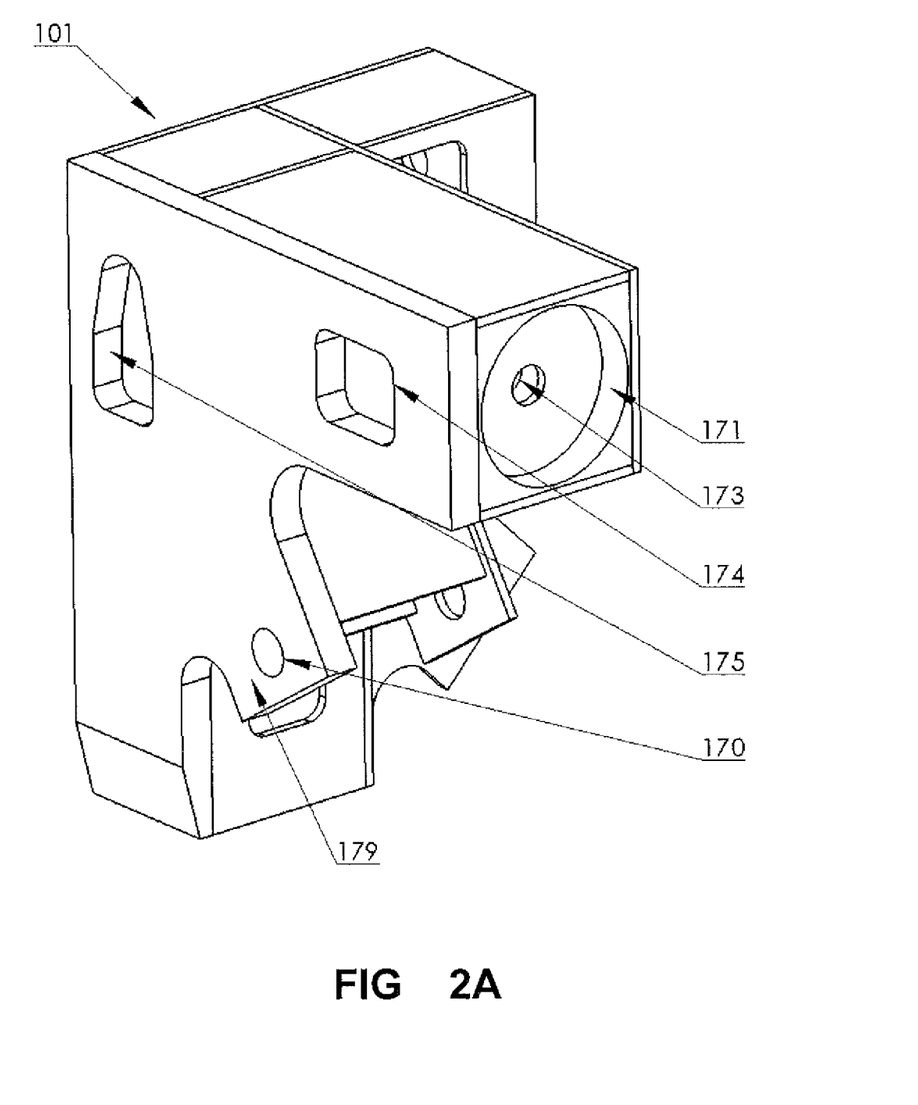
FIG. 2A and FIG. 2B illustrate a top corner connector of a casing tensioner platform frame kit according to an embodiment of the present invention.
Figure 2B:
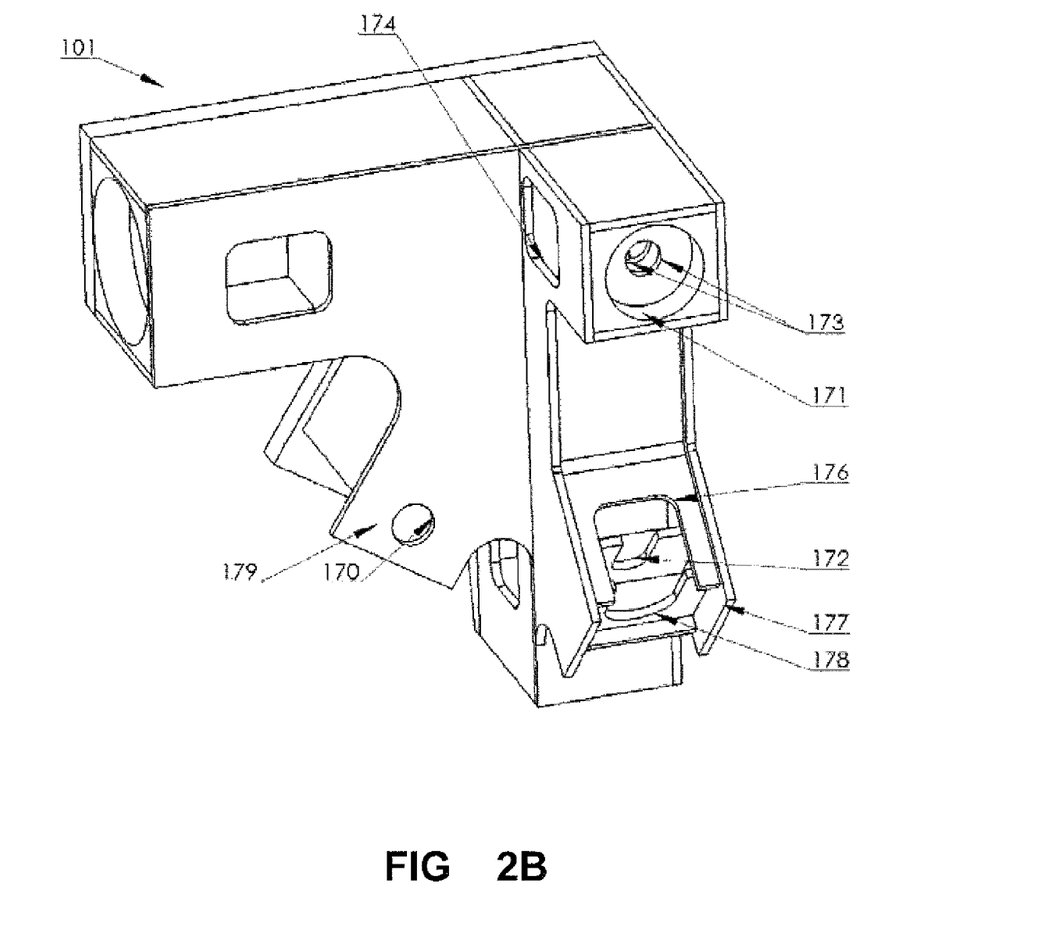
Figure 3A:
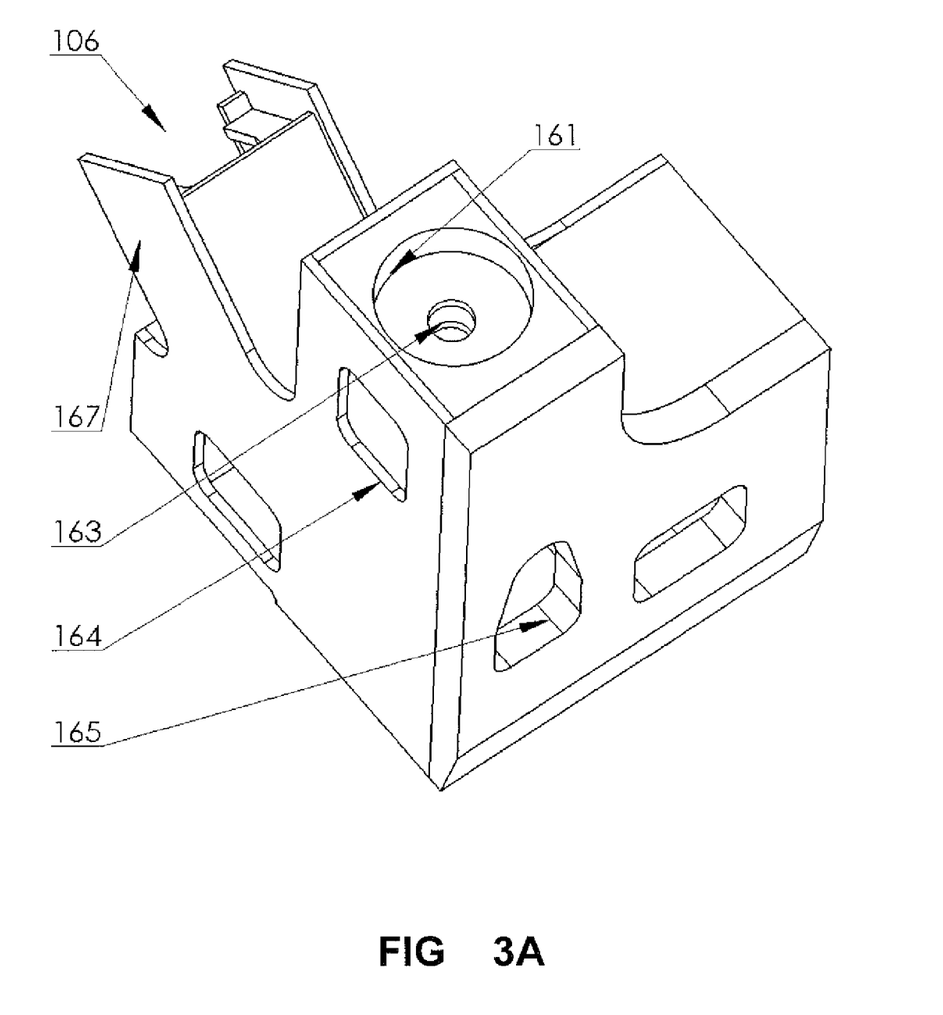
FIG. 3A and FIG. 3B illustrate a bottom corner connector of a casing tensioner platform frame kit according to an embodiment of the present invention.
Figure 3B:
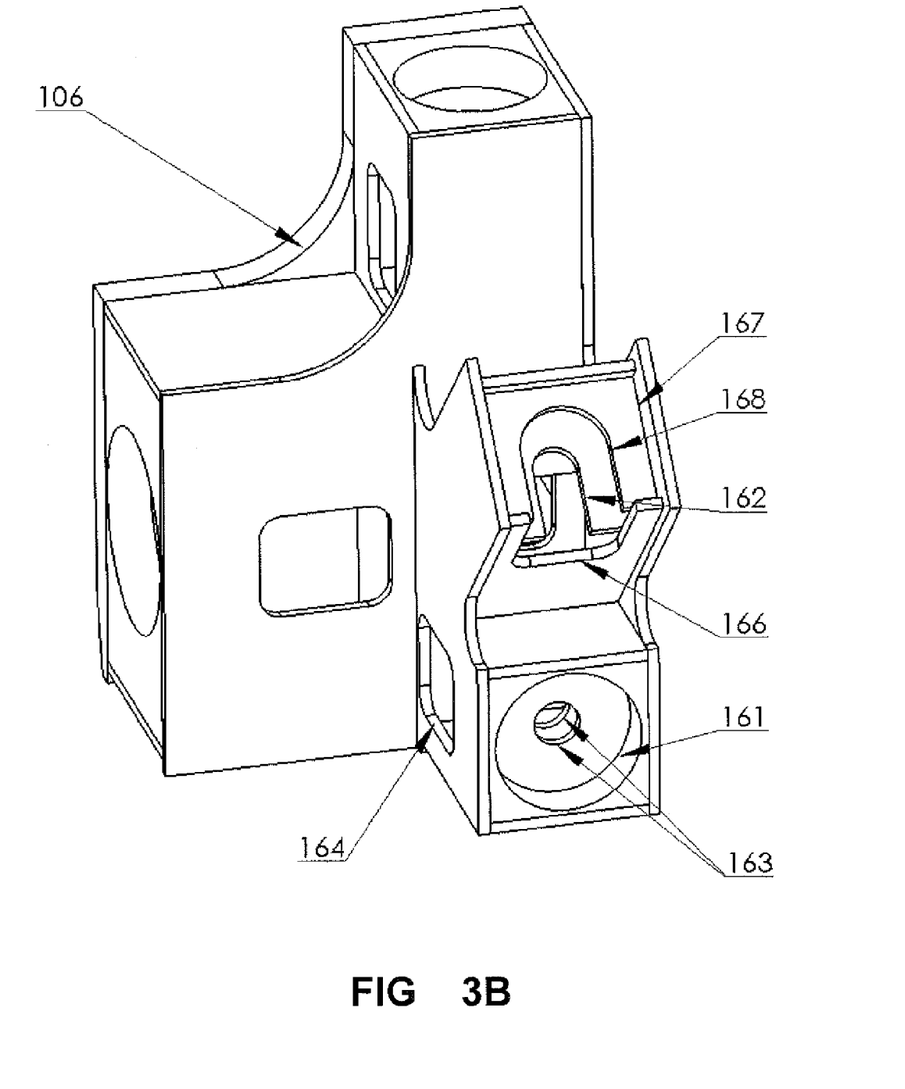
Figure 5:
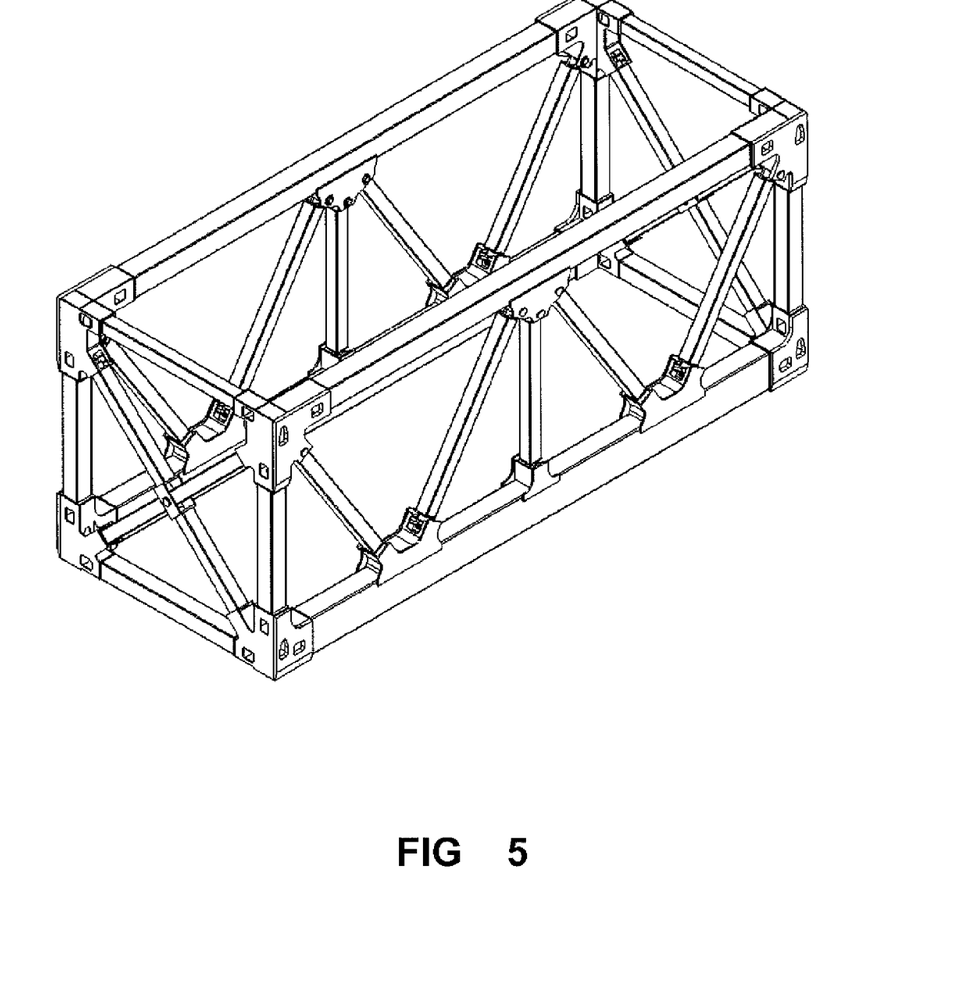
FIG. 5 illustrates a structural diagram of a casing tensioner platform frame according to an embodiment of the present invention.

As shown in FIG. 5, the present invention provides a casing tensioner platform frame. FIG. 5 illustrates an assembled casing tensioner platform frame. FIG. 1 illustrates a kit for assembling the casing tensioner platform frame. Referring to FIG. 1 and FIG. 5, the casing tensioner platform frame comprises:

A frame is composed of four front beams, four lateral beams, four posts and eight corner connectors. The frame is hexahedral and the eight corner connectors are disposed at eight vertexes of the hexahedral frame. According to the embodiment shown in the Figures, the eight corner connectors comprises four top corner connectors 101 disposed at top vertexes and four bottom corner connectors 106 disposed at bottom vertexes. FIGS. 2A and 2B illustrate a top corner connector of the casing tensioner platform frame kit. FIGS. 3A and 3B illustrate a bottom corner connector of the casing tensioner platform frame kit.

Each of the top corner connector 101 and the bottom corner connector 106 has three main mounting brackets perpendicular to each other. Referring to the reference three dimensional coordinate system provided in FIG. 1, the three main mounting brackets of each corner connector extend along X axis, Y axis and Z axis respectively. Continue with the reference three dimensional coordinate system, two planes of the hexahedral frame that are parallel to the XZ plane are defined as front planes, two planes of the hexahedral frame that are parallel to the YZ plane are defined as lateral planes. Each corner connector has an auxiliary mounting bracket extending diagonally between two main mounting brackets which constitute a lateral plane. The three main mounting brackets of each corner connector are connected to one front beam, one lateral beam and one post respectively.

According to the embodiment shown in the Figures, the four front beams comprise two top front beams 111 disposed on the top and two bottom front beams 108 disposed on the bottom. In one embodiment, the cross section of the bottom front beam 108 is larger than the cross section of the top front beam 111, that is, the bottom front beam 108 is stronger. Generally speaking, the bottom front beam 108 bears more load than the top front beam 111 does. In another embodiment, the cross section of the bottom front beam 108 may be the same as that of the top front beam 111, that is, the bottom front beam and the top front beam may be the same component. The bottom front beam and the top front beam being the same component may enhance the versatility of the components. According to the embodiment shown in the Figures, the four lateral beams comprise two top lateral beams 151 disposed on the top and two bottom lateral beams 105 disposed on the bottom. In one embodiment, the top lateral beam 151 and the bottom lateral beam 105 are the same component. However, if necessary, the cross section of the bottom lateral beam 105 may be larger than the cross section of the top lateral beam 151.

Continue with FIG. 1, for each top corner connector 101, the three main mounting brackets are configured as follows: the main mounting bracket along the X axis is connected to the top front beam 111, the main mounting bracket along the Y axis is connected to the top lateral beam 151, the main mounting bracket along the Z axis is connected to the post 104. For each bottom corner connector 106, the three main mounting brackets are configured as follows: the main mounting bracket along the X axis is connected to the bottom front beam 108, the main mounting bracket along the Y axis is connected to the bottom lateral beam 105, the main mounting bracket along the Z axis is connected to the post 104.

As shown in FIG. 2A and FIG. 2B, it is illustrated a top corner connector of a casing tensioner platform frame kit according to an embodiment of the present invention. FIG. 2A and FIG. 2B illustrate the top corner connector from different perspectives. The three main mounting brackets of the top corner connector 101 each forms a cylindrical spigot 171 and a mounting hole 173 on the end. An operation hole 174 is disposed on the main mounting bracket approximating the cylindrical spigot 171. Referring to FIG. 1, FIG. 2A and FIG. 2B, the top corner connector further has a moon pool positioning hole 175, which is disposed on the front plane (the XZ plane). The moon pool positioning hole 175 is used to connect the casing tensioner platform frame to the moon pool. Similarly, as shown in FIG. 3A and FIG. 3B, it is illustrated a bottom corner connector of a casing tensioner platform frame kit according to an embodiment of the present invention. The three main mounting brackets of the bottom corner connector 106 each forms a cylindrical spigot 161 and a mounting hole 163 on the end. An operation hole 164 is disposed on the main mounting bracket approximating the cylindrical spigot 161. Referring to FIG. 1, FIG. 3A and FIG. 3B, the bottom corner connector further has a moon pool positioning hole 165, which is disposed on the front plane (the XZ plane). The moon pool positioning hole 165 is used to connect the casing tensioner platform frame to the moon pool.

Continue with FIG. 1, the front beams (including the front beams 111 and the bottom beams 108), the lateral beams (including the top lateral beams 151 and the bottom lateral beams 105) and the posts 104 each forms an end cylinder and a mounting screw on both ends. Each end cylinder of the front beams, the lateral beams and the posts matches a cylindrical spigot of a corresponding main mounting bracket respectively. The end cylinder is a cylindrical step disposed on the ends of the front beams, the lateral beams and the posts (as shown in FIG. 1), and the cylindrical spigot is a cylindrical recess disposed on the ends of the main mounting brackets. The end cylinder and the cylindrical spigot match each other, the end cylinder is inserted into the cylindrical spigot for connection. The mounting screw is disposed at the center of the end cylinder, the mounting hole is disposed at the center of the cylindrical spigot. The diameter of the mounting screw matches the diameter of the mounting hole. Each end cylinder of the front beams, the lateral beams and the posts is inserted into the cylindrical spigot of the corresponding main mounting bracket, the mounting screw passes through the mounting hole and enters into the main mounting bracket. A mounting nut with a diameter larger than the mounting hole is screwed on the mounting screw, so that the front beams, the laterals and the posts are connected to the main mounting brackets of the corner connectors via the mounting screws and the mounting nuts. Because the assembly of the mounting nut is performed within the main mounting bracket, the operation holes 174 and 164 are provided to facilitate the assembly of the mounting nut. It should be noted that, though mounting screws and mounting nuts are provided as an example for implementing the connection here, one of the ordinary skilled in the art may realize that other forms of connection may be used. Also, one of the ordinary skilled in the art may realize that pads may be used accompany with the mounting nuts for fastening.

Continue with FIG. 1, pads 107 may be inserted between the end cylinders of the front beams (including the top front beams 111 and the bottom front beams 108), the lateral beams (including the top lateral beams 151 and the bottom lateral beams 105) or the posts and the cylindrical spigots of the corresponding main mounting brackets. The pads 107 are used to fine-tune the dimensions. If the dimension of a particular component slightly deviates from the standard, or the overall dimension of the frame needs small scale adjustment, it may be implemented by increasing or decreasing the number of the pads 107. In one embodiment, at least one pad 107 is inserted between the end cylinder of each front beam (including the top front beam 111 and the bottom front beam 108), each lateral beam (including the top lateral beam 151 and the bottom lateral beam 105) and each post 104 and the cylindrical spigot of the each corresponding main mounting bracket. Such a configuration may implement a bidirectional dimension adjustment (enlarging or reducing) by increasing or decreasing the number of the pads 107. It should be noted by one of the ordinary skilled in the art that the pad 107 shall also have a mounting hole in the center, and the diameter of the mounting hole shall match the diameter of the mounting screw so that the mounting screw may pass through the mounting hole.

Referring to FIG. 2A, 2B and FIG. 3A, 3B, the top corner connector 101 further has an auxiliary mounting bracket 177, which is disposed on the lateral plane (the YZ plane shown in FIG. 1). The auxiliary mounting bracket 177 extends diagonally between two main mounting brackets which constitute the lateral plane, the inclined angle of the auxiliary mounting bracket may be determined based on the actual shape and size of the casing tensioner platform frame. The auxiliary mounting bracket 177 forms two obround holes, i.e., an outer obround hole 178 and an inner obround hole 172, the auxiliary mounting bracket 177 also has an operation hole 176. The bottom corner connector 106 further has an auxiliary mounting bracket 167, which is disposed on the lateral plane (the YZ plane shown in FIG. 1). The auxiliary mounting bracket 167 extends diagonally between two main mounting brackets which constitute the lateral plane, the inclined angle of the auxiliary mounting bracket may be determined based on the actual shape and size of the casing tensioner platform frame. The auxiliary mounting bracket 167 forms two obround holes, i.e., an outer obround hole 168 and an inner obround hole 162, the auxiliary mounting bracket 167 also has an operation hole 166.

Figures 4A, 4B, 4C:
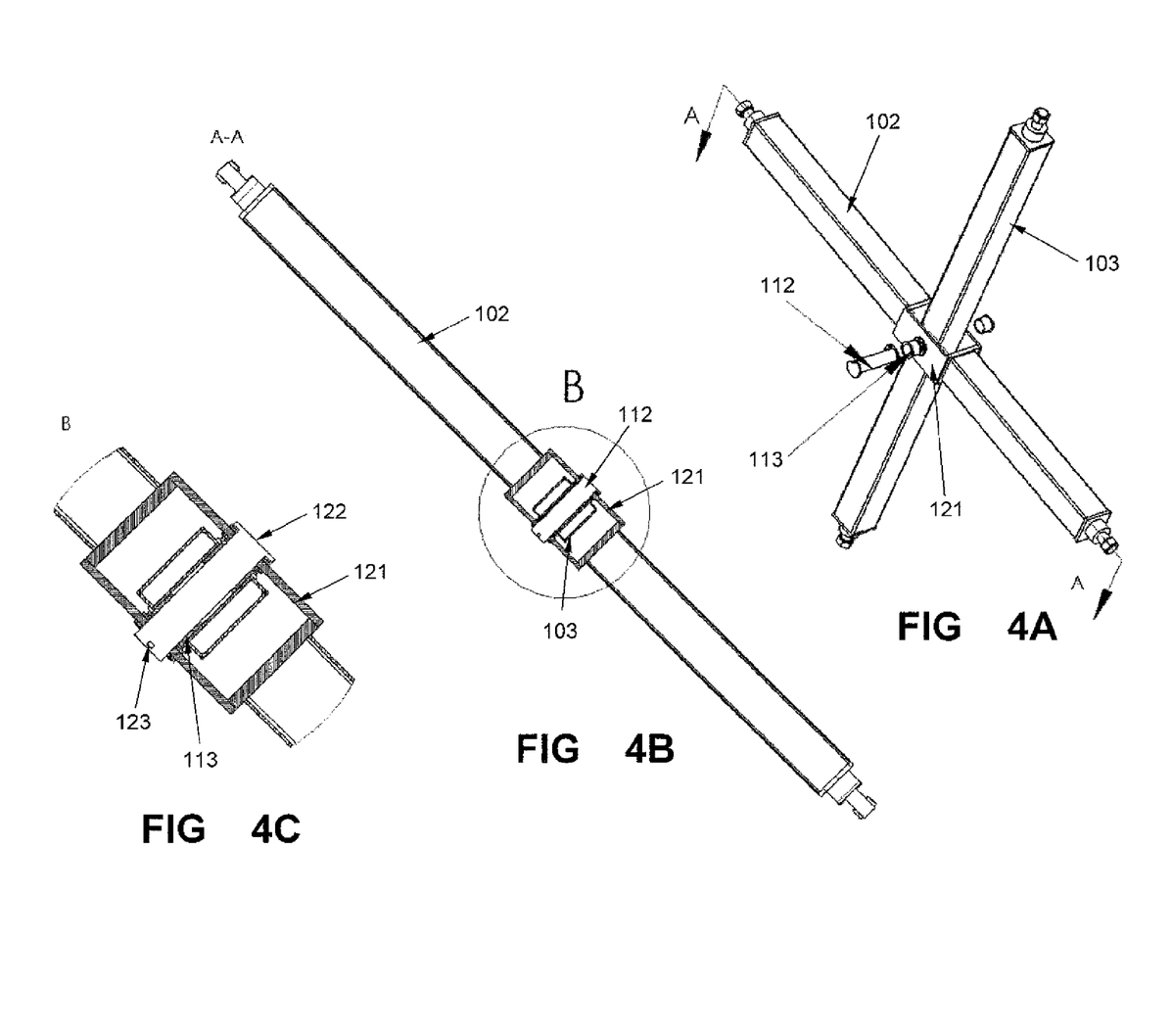
FIG. 4A, FIG. 4B and FIG. 4C illustrate lateral rods of a casing tensioner platform frame kit according to an embodiment of the present invention.

On the lateral plane (the YZ plane shown in FIG. 1), the auxiliary mounting bracket of the corner connector is used to mount the lateral rod. Referring to FIG. 1 and FIG. 5, two pairs of lateral rods are disposed on the two lateral planes (YZ planes) of the hexahedral frame. Each pair of lateral rods comprises two lateral rods which form a cross structure: one main lateral rod 102 and one auxiliary lateral rod 103. FIGS. 4A, 4B and 4C illustrate lateral rods of a casing tensioner platform frame kit according to an embodiment of the present invention. More particularly, FIG. 4B is a sectional view of FIG. 4A along the A-A direction, FIG. 4C is an enlarged diagram of portion B in FIG. 4B. As shown in the Figures, the auxiliary lateral rod 103 is a continuous column with a first bore in the middle. The main lateral rod 102 forms a rectangle orifice 121 in the middle, the dimension of the rectangle orifice 121 is larger than the dimension of the cross section of the auxiliary lateral rod 103, so that the auxiliary lateral rod 103 is able to pass through the rectangle orifice 121. The cross section of the body of the main lateral rod 102 except for the rectangle orifice 121 may be the same as that of the auxiliary lateral rod 103. The rectangle orifice 121 has a second bore thereon that has the same diameter as the first bore. The auxiliary lateral rod 103 passes through the rectangle orifice 121 of the main lateral rod to form a cross structure. The first bore and the second bore align to each other. An axle 112 passes through the first bore and the second bore. The diameter of the axle 112 matches the diameter of the first bore and the second bore.

As shown in FIG. 4C, the axle 112 forms a step cap 122 on one end and the diameter of the step cap 122 is larger than the first bore and the second bore. The axle 112 has a pin hole 123 on the other end, a pin is inserted in the pin hole 123 to connect the main lateral rod 102 and the auxiliary lateral rod 103 so as to form the cross structure. According to the embodiment shown in the Figures, the axle 112 is coated with a lubrication sleeve 113.

The ends of the two lateral rods which form the cross structure, in other words, the ends of one pair of lateral rods are connected to the auxiliary mounting brackets of four corner connectors respectively. For each lateral rod, two ends of the lateral rod are connected to the auxiliary mounting brackets of two corner connectors that are disposed diagonally. Referring to FIG. 1, two ends of the main lateral rod 102 are connected to the top corner connector 101 and the bottom corner connector 106 that are disposed diagonally. And two ends of the auxiliary lateral rod 103 are connected to another top corner connector and another bottom corner connecter that are disposed diagonally.

As shown in FIG. 4A and FIG. 4B, the lateral rods including the main lateral rod 102 and the auxiliary lateral rod 103 form an end cylinder and a mounting screw on each end. Each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket. Each end cylinder of the lateral rods is mounted into the semicircle of the outer obround hole of the corresponding auxiliary mounting bracket, the mounting screw enters the semicircle of the inner obround hole and a mounting nut with a diameter larger than the mounting screw is screwed on the mounting screw, so that the lateral rods are connected to the auxiliary mounting brackets of the corner connectors. The assembly of the mounting nut shall be performed within the auxiliary mounting bracket as well. Since the obround holes of the auxiliary mounting bracket are semi-open, the assembly of the mounting nut may be operated through the open parts of the obround holes directly. In some embodiments, operation holes such as the operation holes 176 and 166 may also be provided on the auxiliary mounting bracket so as to facilitate the assembly of the mounting nut. It should be noted that, though mounting screws and mounting nuts are provided as an example for implementing the connection here, one of the ordinary skilled in the art may realize that other forms of connection may be used. Also, one of the ordinary skilled in the art may realize that pads may be used accompany with the mounting nuts for fastening.

A plurality of front rods are disposed on the front plane (the XZ plane shown in FIG. 1) of the hexahedral frame. One end of the front rod 109 forms a fixing sheet and a fixing pin, the other end of the front rod 109 forms an end cylinder and a mounting screw. According to the embodiment shown in the Figures, the lower end of the front rod 109 forms the end cylinder and the mounting screw, the upper end of the front rod 109 forms the fixing sheet and the fixing pin 110. Rod connectors and rod retainers 190 are used to fix the front rods 109. According to the embodiment shown in the Figures, at least one rod connector is mounted on the bottom front beam 108, and at least one rod retainer 190 is mounted on the top front beam 111. The rod connector has at least one rod mounting bracket, and the rod retainer 190 has at least one rod fixing point. The lower end of each front rod 109 is connected to the rod mounting bracket, and the upper end of each front rod 109 is connected to the rod fixing point.

The bottom of the rod connector is mounted on the bottom front beam 108, the top of the rod connector has at least one rod mounting bracket 183. The rod mounting bracket 183 extends diagonally, and has an angle of 0°~180° with respect to the horizontal. The rod mounting bracket 183 has two obround holes, i.e., one outer obround hole and one inner obround hole. The structure of the rod mounting bracket 183 is similar to the structure of the auxiliary mounting brackets shown in FIG. 2B and FIG. 3B. According to the embodiment shown in the Figures, two types of rod connectors are shown. A first rod connector 181 has two rod mounting brackets 183 on both ends that extend diagonally along two directions. A second rod connector 182 has one rod connector 183, which is perpendicular to the horizontal plane and extends upwards. The end cylinder of the front rod 109 matches the semicircle of the outer obround hole of the corresponding rod mounting bracket, and the diameter of the mounting screw matches the diameter of the semicircle of the inner obround hole of the corresponding rod mounting bracket. The end cylinder on the lower end of the front rod is mounted into the semicircle of the outer obround hole of the corresponding rod mounting bracket, the mounting screw enters the semicircle of the inner obround hole and a mounting nut with a diameter larger than the mounting screw is screwed on the mounting screw, so that the lower end of the front rod is connected to the rod mounting bracket of the rod connector. The assembly method of the front rod and rod mounting bracket is similar to the assembly method of the lateral rod and the auxiliary mounting bracket, which has been described above and will not be repeated here. Similarly, operation holes may be provided on the rod mounting bracket at a position approximating the two obround holes. It should be noted that, when necessary, pads may be provided to facilitate the fastening of the mounting nut.

The top of the rod retainer 190 is mounted on the top front beam 111, the bottom of the rod retainer 190 forms at least one rod fixing point. According to the embodiment shown in the Figures, the rod fixing point of the rod retainer 190 is a bore, the diameter of which matches the diameter of the fixing pin 110. The fixing sheet on the upper end of the front rod 109 touches one side of the rod retainer and the fixing pin passes through the bore, a pin nut with a diameter larger than the bore is screwed on the fixing pin from the other side of the rod retainer, so that the upper end of the front rod is connected to the rod retainer. It should be noted that, when necessary, pads may be provided between the pin nut and the rod retainer to facilitate the fastening of the pin nut.

According to the embodiment shown in FIG. 1 and FIG. 5, five front rods 109 are disposed on each front plane (each XZ plane). Two first rod connectors 181 and one second rod connector 182 are disposed on each bottom front beam 108. The second rod connector 182 is disposed between the two first rod connectors 181. One rod retainer 190 is disposed on each top front beam 111. The bottom of the rod retainer 190 forms three rod fixing points, that is, three bores, which are arranged along an arc. The upper ends of the three front rods 109 in the middle are connected to the three rod fixing points of the rod retainer 190 respectively. The lower ends of the three front rods 109 in the middle are connected to three rod mounting brackets 183 on two first rod connectors 181 and one second rod connector 182 respectively, where the rod mounting bracket near the inside on each first rod connector 181 are connected to the lower ends of the front rods 109 in the middle. The lower ends of the two front rods 109 on the sides are connected to two rod mounting brackets 183 on two first rod connectors 181 respectively, where the rod mounting bracket near the outside on each first rod connector 181 are connected to the lower ends of the front rods 109 on the sides. The upper ends of the two front rods 109 on the sides are connected to the fixing points on the top corner connectors 101. Back to the top corner connector shown in FIG. 2A and FIG. 2B, each top corner connector further has an auxiliary rod retainer 179 extending diagonally between two main mounting brackets which constitute a front plane (the XZ plane), the auxiliary rod retainer 179 forms a rod fixing point 170, which is a bore.

In this manner, a casing tensioner platform frame as shown in FIG. 5 is assembled.

It should be noted that, FIG. 5 is merely an illustrative embodiment of the casing tensioner platform frame of the present invention. The casing tensioner platform frame of the present invention shall not be limited to the structure shown in the embodiments. For example, the number of front rods may be selected according to actual requirements. Or, the mounting positions of the rod connectors and the rod retainers may be changed, for instance, the rod connectors may be mounted on the top front beams and the rod retainers may be mounted on the bottom front beams.

From a broader perspective, the present invention provides a casing tensioner platform frame kit, which may be assembled to form a casing tensioner platform frame. The kit comprises frame components, corner connectors, rod components and rod connection components.

The frame components comprise front beams, lateral beams and posts.

Each corner connector has three main mounting brackets which are perpendicular to each other, the corner connector further has an auxiliary mounting bracket extending diagonally between two main mounting brackets which constitute a lateral plane.

The rod components comprise front rods and lateral rods.

The rod connection components comprise rod connectors and rod retainers. The rod connector is mounted on the front beam, and has at least one rod mounting bracket. The rod retainer is mounted on the front beam, and has at least one rod fixing point. The rod connector and the rod retainer are mounted on front beams that are disposed oppositely.

The front beams, the lateral beams and the posts are connected via the corner connectors to constitute a hexahedral frame. The three main mounting brackets of each corner connector are connected to one front beam, one lateral beam and one post respectively.

The lateral rods are connected via the auxiliary mounting brackets of the corner connectors. Two ends of each lateral rod are connected to the auxiliary mounting brackets of two corner connectors that are disposed diagonally.

The front rods are connected via the rod connectors and the rod retainers. Two ends of each front rod are connected to one rod mounting bracket and one rod fixing point respectively.

Each end of the front beams, the lateral beams and the posts forms an end cylinder and a mounting screw. The three main mounting brackets of the corner connector each forms a cylindrical spigot and a mounting hole. Each end cylinder of the front beams, the lateral beams and the posts matches the cylindrical spigot of the corresponding main mounting bracket respectively, and the diameter of the mounting screw matches the diameter of the corresponding mounting hole. Each end cylinder of the front beams, the lateral beams and the posts is inserted into the cylindrical spigot of the corresponding main mounting bracket, the mounting screw passes through the corresponding mounting hole and a mounting not with a diameter larger than the mounting hole is screwed on the mounting screw, so that the front beams, the laterals and the posts are connected to the main mounting brackets of the corner connectors.

Pads are inserted between the end cylinders of the front beams, the lateral beams and the posts and the cylindrical spigots of the corresponding main mounting brackets.

Each end of the lateral rods forms an end cylinder and a mounting screw. The auxiliary mounting bracket of the corner connector forms two obround holes. Each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket. Each end cylinder of the lateral rods is mounted into the semicircle of the outer obround hole of the corresponding auxiliary mounting bracket, the mounting screw enters the semicircle of the inner obround hole and a mounting nut with a diameter larger than the mounting screw is screwed on the mounting screw, so that the lateral rods are connected to the auxiliary mounting brackets of the corner connectors.

The lateral rods comprise main lateral rods and auxiliary lateral rods, where one main lateral rod and one auxiliary lateral rod are used in pairs. The auxiliary lateral rod is a continuous column with a first bore in the middle. The main lateral rod forms a rectangle orifice in the middle. The dimension of the rectangle orifice is larger than the dimension of the cross section of the auxiliary lateral rod. The rectangle orifice has a second bore thereon, the second bore has the same diameter as the first bore. The auxiliary lateral rod passes through the rectangle orifice of the main lateral rod to form a cross structure. The first bore and the second bore align to each other. An axle passes through the first bore and the second bore. The diameter of the axle matches the diameter of the first bore and the second bore. The axle forms a step cap on one end and the diameter of the step cap is larger than the first bore and the second bore. The axle has a pin hole on the other end, and a pin is inserted in the pin hole to connect the main lateral rod and the auxiliary lateral rod.

The main mounting bracket of the corner connector has an operation hole approximating the cylindrical spigot. The auxiliary mounting bracket of the corner connector has an operation hole approximating the obround hole. The corner connector further has a moon pool positioning hole. The corner connectors comprise top corner connectors and bottom corner connectors. The top corner connector further has an auxiliary rod retainer extending diagonally between two main mounting brackets which constitute a front plane. The auxiliary rod retainer forms a rod fixing point.

One end of the front rod forms an end cylinder and a mounting screw, the other end of the front rod forms a fixing sheet and a fixing pin. The rod mounting bracket of the rod connector has two obround holes. The rod fixing point of the rod retainer is a bore. Each end cylinder of the front rods matches the semicircle of the outer obround hole of the corresponding rod mounting bracket. The diameter of the mounting screw matches the diameter of the semicircle of the inner obround hole of the corresponding rod mounting bracket, and the diameter of the bore matches the diameter of the fixing pin. Each end cylinder on one end of the from rods is mounted into the semicircle of the outer obround hole of the corresponding rod mounting bracket, the mounting screw enters the semicircle of the inner obround hole and a mounting nut with a diameter larger than the mounting screw is screwed on the mounting screw, so that one end of the front rods are connected to the rod mounting brackets of the rod connectors. Each fixing sheet on the other end of the front rods touches one side of the rod retainer and the fixing pin passes through the bore. A pin nut with a diameter larger than the bore is screwed on the fixing pin from the other side of the rod retainer, so that the other end of the front rods are connected to the rod retainers.

The front beams comprise top front beams and bottom front beams. According to actual requirements, the cross section of the bottom front beam may be larger than the cross section of the top front beam. Or the bottom front beam and the top front beam may be the same component so as to enhance the versatility of the components. The lateral beams comprise top lateral beams and bottom lateral beams. According to actual requirements, the cross section of the bottom lateral beam may be larger than the cross section of the top lateral beam. Or the bottom lateral beam and the top lateral beam may be the same component so as to enhance the versatility of the components.

The casing tensioner platform frame kit and the casing tensioner platform frame assembled by the kit provided by the present invention may be easily assembled or disassembled. The assembly or disassembly is implemented via prefabricated mounting components without any welding. The casing tensioner platform frame kit may be transported in the manner of components and be assembled at field. The cost of transportation and installation is significantly reduced while the quality and safety of the product is ensured.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. A casing tensioner platform frame kit comprising:
   frame components comprising front beams, lateral beams and posts, wherein each end of the front beams, the lateral beams and the posts forms an end cylinder and a mounting screw;
   corner connectors, each corner connector having three main mounting brackets perpendicular to each other, the corner connector further having an auxiliary mounting bracket extending diagonally between two main mounting brackets which constitute a lateral plane, wherein the three main mounting brackets of the corner connector each forms a cylindrical spigot and a mounting hole, and each end cylinder of the front beams, the lateral beams and the posts matches the cylindrical spigot of the corresponding main mounting bracket respectively, and the diameter of the mounting screw matches the diameter of the corresponding mounting hole;
   rod components comprising front rods and lateral rods;
   rod connection components comprising rod connectors and rod retainers, wherein the rod connector is mounted on the front beam, the rod connector has at least one rod mounting bracket, the rod retainer is mounted on the front beam, the rod retainer has at least one rod fixing point, wherein the rod connector and the rod retainer are mounted on front beams that are disposed oppositely;
   wherein the front beams, the lateral beams and the posts can be connected via the corner connectors to constitute a hexahedral frame, when constituting the hexahedral frame, the three main mounting brackets of each corner connector are connected to one front beam, one lateral beam and one post respectively;
   wherein the lateral rods are connected via the auxiliary mounting brackets of the corner connectors, two ends of each lateral rod are connected to the auxiliary mounting brackets of two corner connectors that are disposed diagonally;
   wherein the front rods are connected via the rod connectors and the rod retainers, two ends of each front rod are connected to one rod mounting bracket and one rod fixing point respectively; and
   wherein each end cylinder of the front beams, the lateral beams and the posts is inserted into the cylindrical spigot of the corresponding main mounting bracket, the mounting screw passes through the corresponding mounting hole and a mounting nut with a diameter larger than the mounting hole is screwed on the mounting screw, so that the front beams, the laterals and the posts are connected to the main mounting brackets of the corner connectors.

2. The casing tensioner platform frame kit according to claim 1, wherein pads are inserted between the end cylinders of the front beams, the lateral beams and the posts and the cylindrical spigots of the corresponding main mounting brackets.

3. The casing tensioner platform frame kit according to claim 1, wherein each end of the lateral rods forms an end cylinder and a mounting screw;
   the auxiliary mounting bracket of the corner connector forms two obround holes;
   each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket;
   each end cylinder of the lateral rods is mounted into the semicircle of the outer obround hole of the corresponding auxiliary mounting bracket, the mounting screw enters the semicircle of the inner obround hole and a mounting nut with a diameter larger than the mounting screw is screwed on the mounting screw, so that the lateral rods are connected to the auxiliary mounting brackets of the corner connectors.

4. The casing tensioner platform frame kit according to claim 3, wherein the lateral rods comprise main lateral rods and auxiliary lateral rods, wherein one main lateral rod and one auxiliary lateral rod are used in pairs;
   the auxiliary lateral rod is a continuous column with a first bore in the middle;
   the main lateral rod forms a rectangle orifice in the middle, the dimension of the rectangle orifice is larger than the dimension of the cross section of the auxiliary lateral rod, the rectangle orifice has a second bore thereon, the second bore has the same diameter as the first bore;
   the auxiliary lateral rod passes through the rectangle orifice of the main lateral rod to form a cross structure, the first bore and the second bore align to each other and an axle passes through the first bore and the second bore, the diameter of the axle matches the diameter of the first bore and the second bore, the axle forms a step cap on one end and the diameter of the step cap is larger than the first bore and the second bore, the axle has a pin hole on the other end, a pin is inserted in the pin hole to connect the main lateral rod and the auxiliary lateral rod.

5. The casing tensioner platform frame kit according to claim 3, wherein the main mounting bracket of the corner connector has an operation hole approximating the cylindrical spigot;
the auxiliary mounting bracket of the corner connector has an operation hole approximating the obround hole;
the corner connector further has a moon pool positioning hole.

6. The casing tensioner platform frame kit according to claim 3, wherein one end of the front rod forms an end cylinder and a mounting screw, the other end of the front rod forms a fixing sheet and a fixing pin;
the rod mounting bracket of the rod connector has two obround holes, the rod fixing point of the rod retainer is a bore;
each end cylinder of the front rods matches the semicircle of the outer obround hole of the corresponding rod mounting bracket, and the diameter of the mounting screw matches the diameter of the semicircle of the inner obround hole of the corresponding rod mounting bracket, the diameter of the bore matches the diameter of the fixing pin;
each end cylinder on one end of the front rods is mounted into the semicircle of the outer obround hole of the corresponding rod mounting bracket, the mounting screw enters the semicircle of the inner obround hole and a mounting nut with a diameter larger than the mounting screw is screwed on the mounting screw, so that one end of the front rods are connected to the rod mounting brackets of the rod connectors;
each fixing sheet on the other end of the front rods touches one side of the rod retainer and the fixing pin passes through the bore, a pin nut with a diameter larger than the bore is screwed on the fixing pin from the other side of the rod retainer, so that the other end of the front rods are connected to the rod retainers.

7. The casing tensioner platform frame kit according to claim 1, wherein the corner connectors comprise top corner connectors and bottom corner connectors;
the top corner connector further has an auxiliary rod retainer extending diagonally between two main mounting brackets which constitute a front plane, the auxiliary rod retainer forms a rod fixing point.

8. The casing tensioner platform frame kit according to claim 1, wherein the front beams comprise top front beams and bottom front beams, the cross section of the bottom front beam is larger than the cross section of the top front beam;
the lateral beams comprise top lateral beams and bottom lateral beams, the cross section of the bottom lateral beam is larger than the cross section of the top lateral beam.

9. A casing tensioner platform frame comprising;
a hexahedral frame composed of four front beams, four lateral beams and four posts connected via eight corner connectors, the eight corner connectors being disposed at eight vertexes of the hexahedral frame, each corner connector having three main mounting brackets perpendicular to each other, the corner connector further having an auxiliary mounting bracket extending diagonally between two main mounting brackets which constitute a lateral plane, the three main mounting brackets of each corner connector connecting to one front beam, one lateral beam and one post respectively;
at least one rod connector being mounted on bottom front beams, at least one rod retainer being mounted on top front beams, the rod connector having at least one rod mounting bracket, the rod retainer having at least one rod fixing point;
two pairs of lateral rods disposed on two lateral planes of the hexahedral frame respectively, each pair of lateral rods comprising two lateral rods which form a cross structure, wherein the ends of the two lateral rods are connected to the auxiliary mounting brackets of four corner connectors respectively;
a plurality of front rods disposed on two front planes of the hexahedral frame respectively, wherein the lower end of each front rod is connected to a rod mounting bracket, the upper end of each front rod is connected to a rod fixing point; and
wherein
each end of the front beams the lateral beams and the posts forms an end cylinder and a mounting screw;
the three main mounting brackets of the corner connector each forms a cylindrical spigot and a mounting hole;
each end cylinder of the front beams, the lateral beams and the oats matches the cylindrical spigot of the corresponding main mounting bracket respectively, and the diameter of the mounting screw matches the diameter of the corresponding mounting hole;
each end cylinder of the front beams, the lateral beams and the posts is inserted into the cylindrical spigot of the corresponding main mounting bracket, the mounting screw passes through the corresponding mounting, hole and a mounting nut with a diameter larger than the mounting hole is screwed on the mounting screw, so that the front beams, the laterals and the posts are connected to the main mounting brackets of the corner connectors.

10. The casing tensioner platform frame according to claim 9, wherein pads are inserted between the end cylinders of the front beams, the lateral beams and the posts and the cylindrical spigots of the corresponding main mounting brackets.

11. The casing tensioner platform frame according to claim 9, wherein each pair of lateral rods is composed of one main lateral rod and one auxiliary lateral rod;
the auxiliary lateral rod is a continuous column with a first bore in the middle;
the main lateral rod forms a rectangle orifice in the middle, the dimension of the rectangle orifice is larger than the dimension of the cross section of the auxiliary lateral rod, the rectangle orifice has a second bore thereon, the second bore has the same diameter as the first bore;
the auxiliary lateral rod passes through the rectangle orifice of the main lateral rod to form a cross structure, the first bore and the second bore align to each other and an axle passes through the first bore and the second bore, the diameter of the axle matches the diameter of the first bore and the second bore, the axle forms a step cap on one end and the diameter of the step cap is larger than the first bore and the second bore, the axle has a pin hole on the other end, a pin is inserted in the pin hole to connect the main lateral rod and the auxiliary lateral rod.

12. The casing tensioner platform frame according to claim 11, wherein each end of the lateral rods forms an end cylinder and a mounting screw;
the auxiliary mounting bracket of the corner connector forms two obround holes;

each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket;

each end cylinder of the lateral rods is mounted into the semicircle of the outer obround hole of the corresponding auxiliary mounting bracket, the mounting screw enters the semicircle of the inner obround hole and a mounting nut with a diameter larger than the mounting screw is screwed on the mounting screw, so that the lateral rods are connected to the auxiliary mounting brackets of the corner connectors.

13. The casing tensioner platform frame according to claim 9, wherein the lower end of the front rod forms an end cylinder and a mounting screw, the upper end of the front rod forms a fixing sheet and a fixing pin;

the rod mounting bracket of the rod connector has two obround holes, the rod fixing point of the rod retainer is a bore;

each end cylinder of the front rods matches the semicircle of the outer obround hole of the corresponding rod mounting bracket, and the diameter of the mounting screw matches the diameter of the semicircle of the inner obround hole of the corresponding rod mounting bracket, the diameter of the bore matches the diameter of the fixing pin;

each end cylinder on the lower end of the front rods is mounted into the semicircle of the outer obround hole of the corresponding rod mounting bracket, the mounting screw enters the semicircle of the inner obround hole and a mounting nut with a diameter larger than the mounting screw is screwed on the mounting screw, so that the lower end of the front rods are connected to the rod mounting brackets of the rod connectors;

each fixing sheet on the upper end of the front rods touches one side of the rod retainer and the fixing pin passes through the bore, a pin nut with a diameter larger than the bore is screwed on the fixing pin from the other side of the rod retainer, so that the upper end of the front rods are connected to the rod retainers.

14. The casing tensioner platform frame according to claim 13, wherein the bottom of the rod connector is mounted on the bottom front beam, the top of the rod connector has at least one rod mounting bracket, the rod mounting bracket extends diagonally with an angle larger than 0° and smaller than 180° with respect to the horizontal;

the top of the rod retainer is mounted on the top front beam, the bottom of the rod retainer forms at least one rod fixing point.

15. The casing tensioner platform frame according to claim 12, wherein the eight corner connectors comprises four top corner connectors and four bottom corner connectors;

the main mounting bracket of the each top corner connector and each bottom corner connector has an operation hole approximating the cylindrical spigot;

the auxiliary mounting bracket of each top corner connector and each bottom corner connector has an operation hole approximating the obround hole;

each top corner connector and each bottom corner connector further has a moon pool positioning hole;

each top corner connector further has an auxiliary rod retainer extending diagonally between two main mounting brackets which constitute a front plane, the auxiliary rod retainer forms a rod fixing point.

16. The casing tensioner platform frame according to claim 9, wherein the cross section of the bottom front beam is larger than the cross section of the top front beam;

the cross section of the bottom lateral beam is larger than the cross section of the top lateral beam.

17. A casing tensioner platform frame comprising:

a hexahedral frame composed of four front beams, four lateral beams and four posts connected via eight corner connectors, the eight corner connectors being disposed at eight vertexes of the hexahedral frame, each corner connector having three main mounting brackets perpendicular to each other, the corner connector further having an auxiliary mounting bracket extending diagonally between two main mounting brackets which constitute a lateral plane, the three main mounting brackets of each corner connector connecting to one front beam, one lateral beam and one post respectively;

at least one rod connector being mounted on bottom front beams, at least one rod retainer being mounted on top front beams, the rod connector having at least one rod mounting bracket, the rod retainer having at least one rod fixing point;

two pairs of lateral rods disposed on two lateral planes of the hexahedral frame respectively, each pair of lateral rods comprising two lateral rods which form a cross structure, wherein the ends of the two lateral rods are connected to the auxiliary mounting brackets of four corner connectors respectively;

a plurality of front rods disposed on two front planes of the hexahedral frame respectively, wherein the lower end of each front rod is connected to a rod mounting bracket, the upper end of each front rod is connected to a rod fixing point;

wherein each pair of lateral rods is composed of one main lateral rod and one auxiliary lateral rod;

the auxiliary lateral rod is a continuous column with a first bore in the middle;

the main lateral rod forms a rectangle orifice in the middle, the dimension of the rectangle orifice is larger than the dimension of the cross section of the auxiliary lateral rod, the rectangle orifice has a second bore thereon, the second bore has the same diameter as the first bore; and the auxiliary lateral rod passes through the rectangle orifice of the main lateral rod to form a cross structure, the first bore and the second bore align to each other and an axle passes through the first bore and the second bore, the diameter of the axle matches the diameter of the first bore and the second bore, the axle forms a step cap on one end and the diameter of the step cap is larger than the first bore and the second bore, the axle has a pin hole on the other end, a pin is inserted in the pin hole to connect the main lateral rod and the auxiliary lateral rod.

18. The casing tensioner platform frame according to claim 17, wherein each end of the lateral rods forms an end cylinder and a mounting screw;

the auxiliary mounting bracket of the corner connector forms two obround holes;

each end cylinder of the lateral rods matches the semicircle of the outer obround hole of the corresponding auxiliary mounting bracket, and the diameter of the mounting screw matches the diameter of the semicircle of the inner obround hole of the corresponding auxiliary mounting bracket; and each end cylinder of the lateral rods is mounted into the semicircle of the outer obround hole of the corresponding auxiliary mounting bracket, the mounting screw enters the semicircle of the inner obround hole and a mounting nut with a diameter larger than the mounting screw is screwed on the mounting screw, so that the lateral rods are connected to the auxiliary mounting brackets of the corner connectors.

19. The easing tensioner platform frame according to claim 18, wherein the eight corner connectors comprises four top corner connectors and four bottom corner connectors;

the main mounting bracket of the each top corner connector and each bottom corner connector has an operation hole approximating the cylindrical spigot;

the auxiliary mounting bracket of each top corner connector and each bottom corner connector has an operation hole approximating the obround hole;

each top corner connector and each bottom corner connector further has a moon pool positioning hole; and each top corner connector further has an auxiliary rod retainer extending diagonally between two main mounting brackets which constitute a front plane, the auxiliary rod retainer forms a rod fixing point.

20. The casing tensioner platform frame according to claim 17, wherein the cross section of the bottom front beam is larger than the cross section of the top front beam; and
the cross section of the bottom lateral beam is larger than the cross section of the top lateral beam.

* * * * *